G. E. GODDARD.
VEHICLE BODY.
APPLICATION FILED DEC. 6, 1915.
1,305,089.
Patented May 27, 1919.
5 SHEETS—SHEET 2.
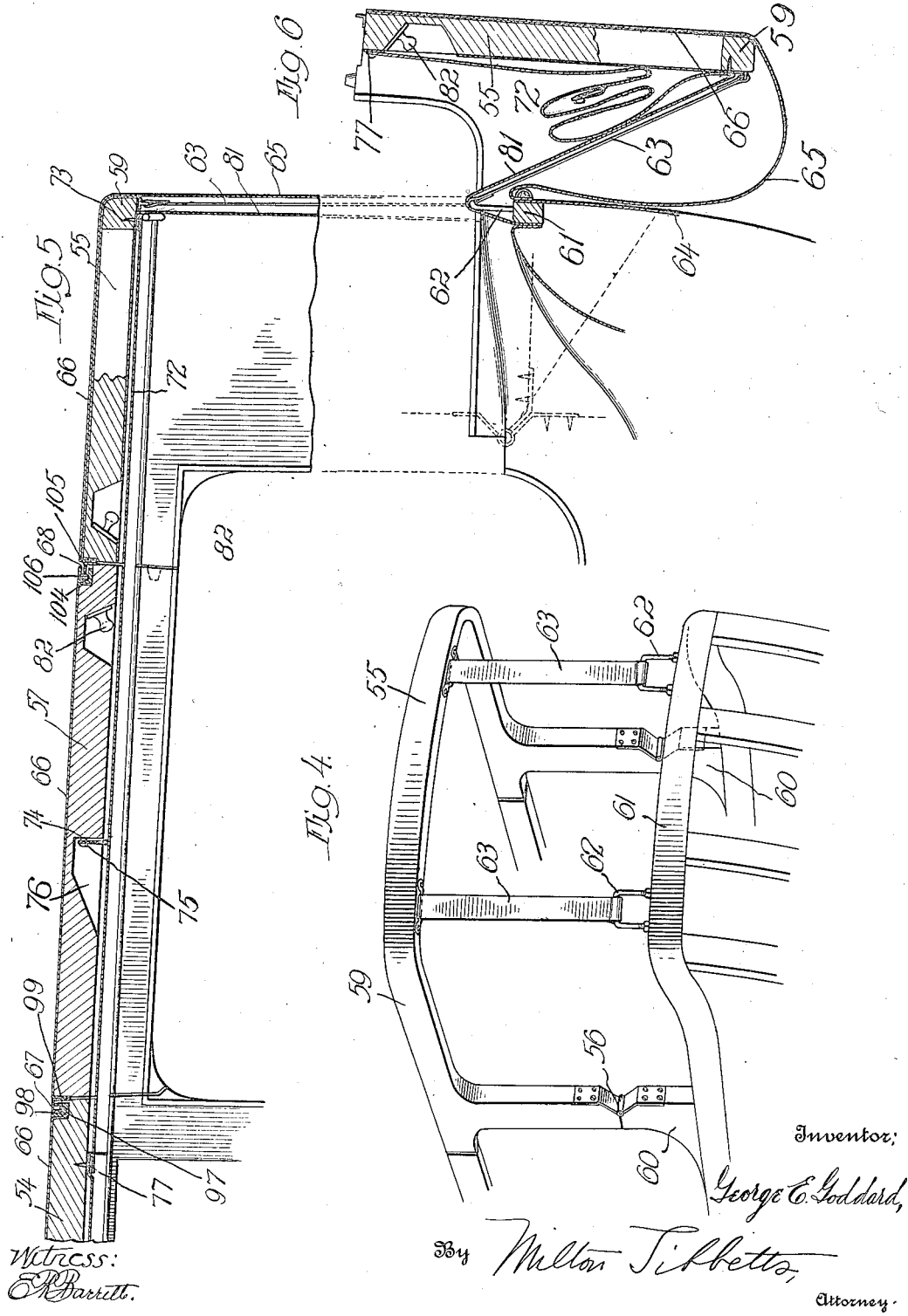
Inventor:
George E. Goddard,
By Milton Tibbetts,
Attorney.
Witness:
E. R. Barrett.

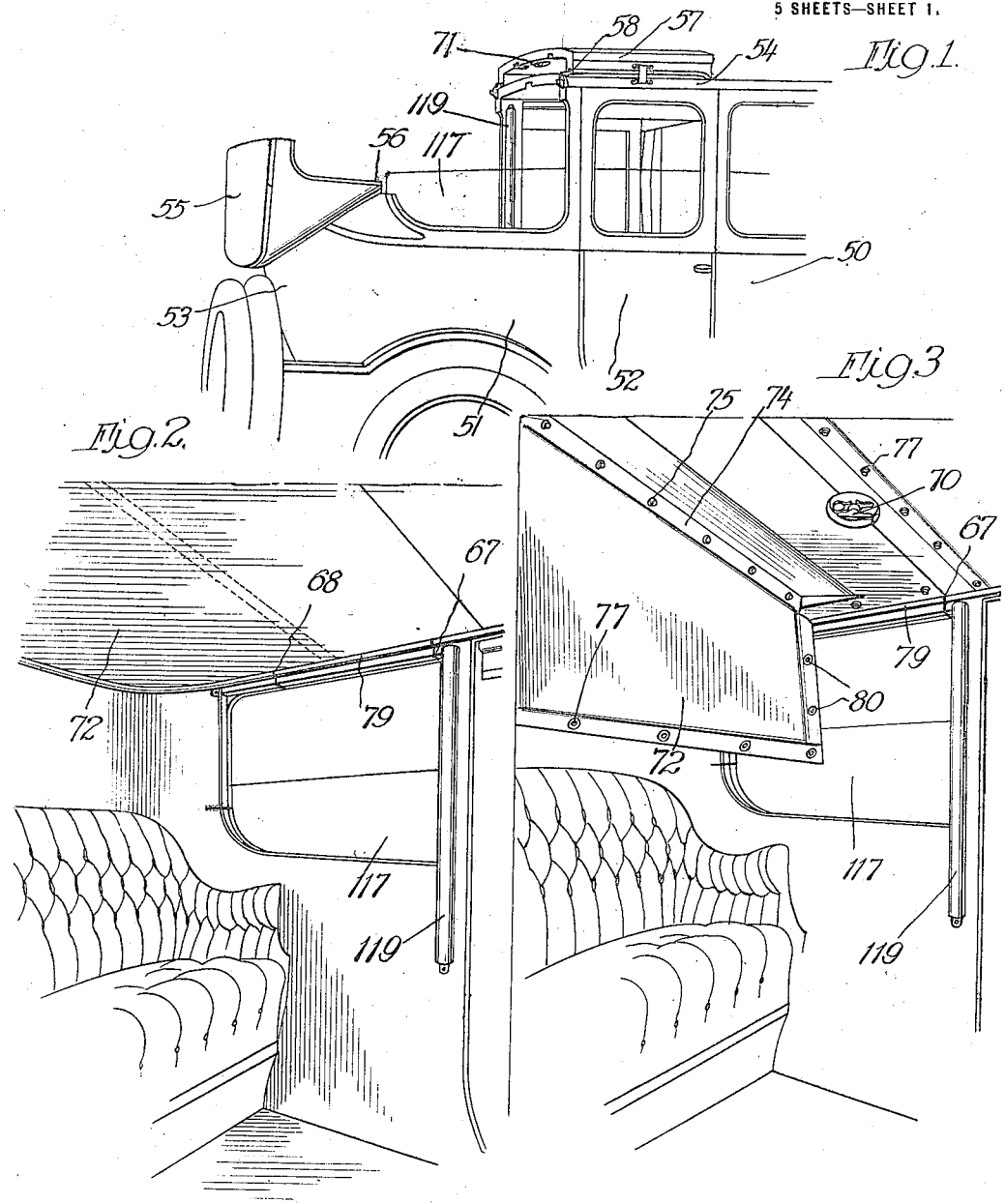

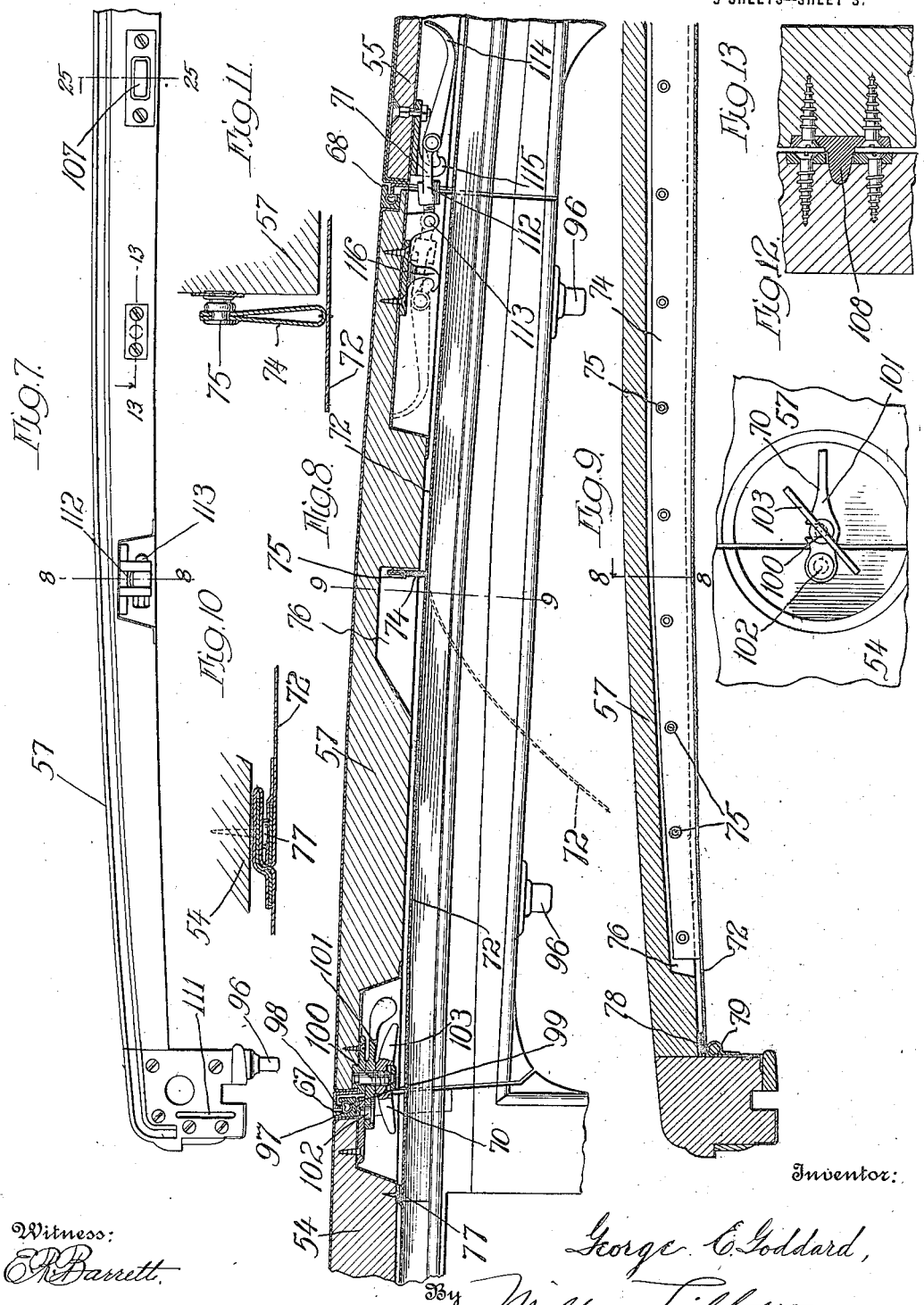

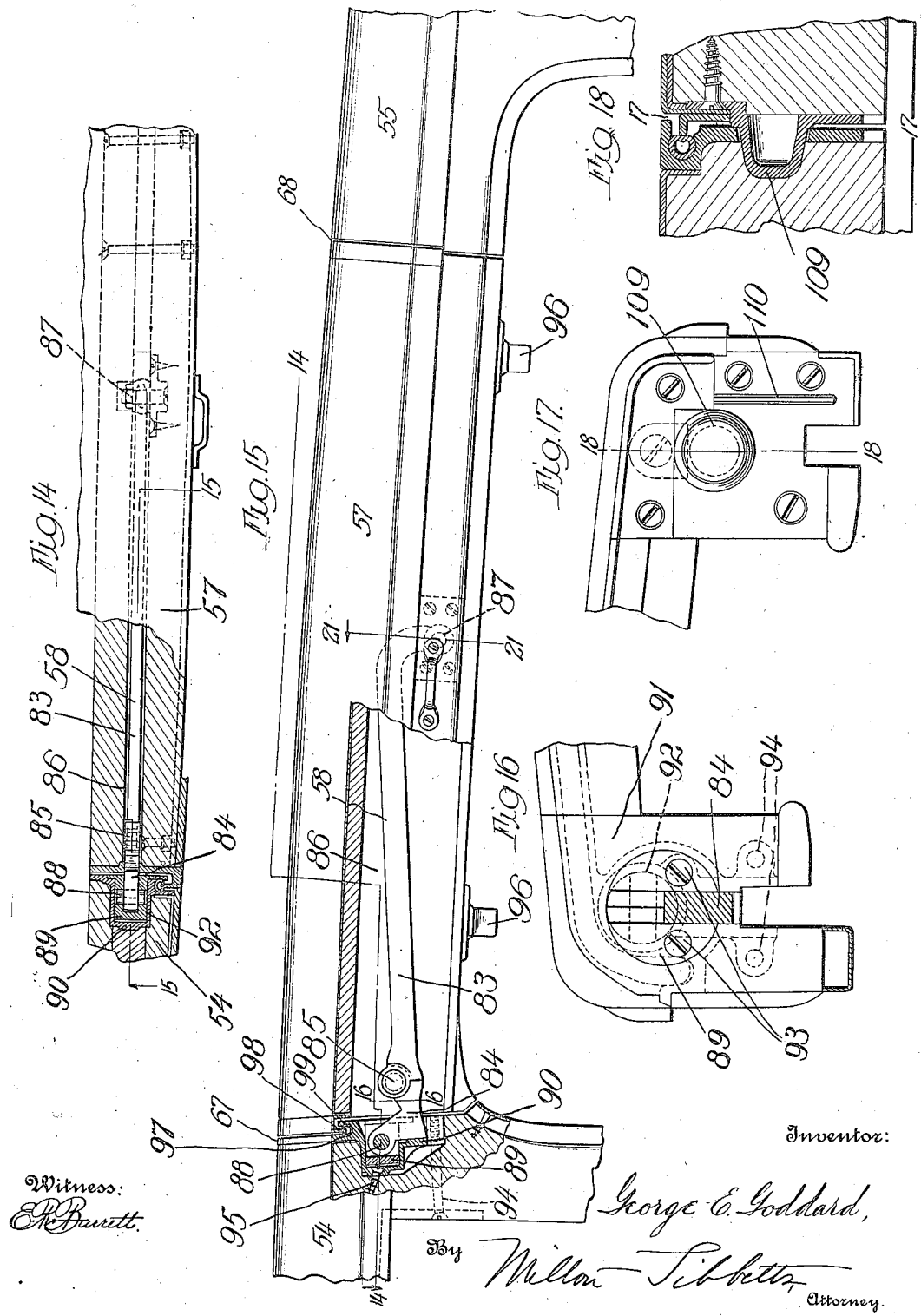

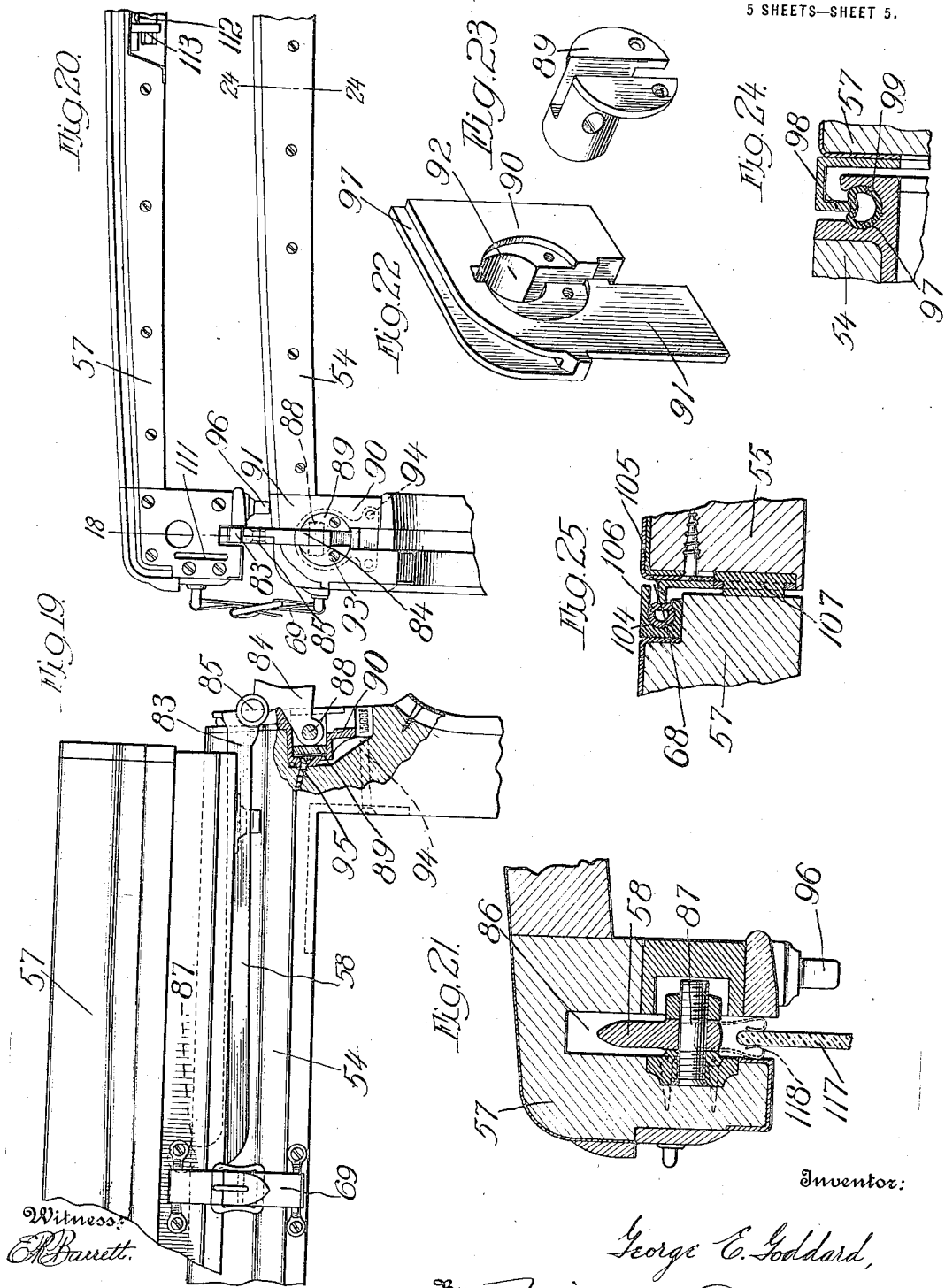

UNITED STATES PATENT OFFICE.

GEORGE E. GODDARD, OF DETROIT, MICHIGAN, ASSIGNOR TO PACKARD MOTOR CAR COMPANY, OF DETROIT, MICHIGAN, A CORPORATION OF MICHIGAN.

VEHICLE-BODY.

1,305,089.

Specification of Letters Patent.  Patented May 27, 1919.

Application filed December 6, 1915.  Serial No. 65,317.

*To all whom it may concern:*

Be it known that I, GEORGE E. GODDARD, a citizen of the United States, and resident of Detroit, Wayne county, State of Michigan, have invented certain new and useful Improvements in Vehicle-Bodies, of which the following is a specification.

This invention relates to vehicle bodies and particularly to bodies of the landaulet type, or bodies having sectional roofs to permit opening the rear part of the body upon occasion.

The salient object of the invention is to provide a body of the above type of simple yet strong and rigid construction while at the same time securing an extremely neat and pleasing appearance with the hardware and mechanical features concealed so far as possible.

This and other objects of the invention will be clearly understood from the following description taken in connection with the drawings, which illustrate a form of the invention and form a part of this specification, and in which:

Figure 1 is a three-quarter side view of a vehicle body embodying this invention, the sections of the roof being shown in folded position;

Fig. 2 is an interior view of the body shown in Fig. 1 with the roof sections in normal position and the head lining in place;

Fig. 3 is a view similar to Fig. 2 showing the head lining partly removed;

Fig. 4 is a perspective view of part of the frame work of the body shown in Fig. 1;

Fig. 5 is a central vertical section through the roof of the body;

Fig. 6 is a vertical section through the middle of the rear part of the body showing the rear roof section in folded position;

Fig. 7 is an elevation view of the rear edge of the intermediate roof portion or section of the body, looking toward the front;

Fig. 8 is a vertical longitudinal section through a portion of the roof of the body substantially parallel to the section shown in Fig. 5 and cutting through the parts of the roof shown in Figs. 7 and 9 at the lines 8—8 of said figures;

Fig. 9 is a transverse vertical section substantially on the line 9—9 of Fig. 8, showing the transverse channel in the intermediate roof section and the intermediate supporting means for the head lining;

Fig. 10 is an enlarged detail sectional view in the same plane as Fig. 8 and illustrating the fastening means for the front edge of the head lining;

Fig. 11 is likewise a detail view in the same plane as Fig. 8 and illustrating the intermediate fastening means for the head lining;

Fig. 12 is an underneath detail view illustrating one of the clamps connecting the intermediate roof section with the forward section;

Fig. 13 is an enlarged detail section substantially on the line 13—13 of Fig. 7;

Fig. 14 is a plan view with parts cut away to illustrate interior construction and shows the left hand side of the intermediate roof section and its link connection with the forward roof section. It is substantially on the line 14—14 of Fig. 15;

Fig. 15 is a side elevation of the intermediate roof section and adjacent parts of the other roof sections, parts being cut away to illustrate the link connection between the intermediate and forward roof sections. It is substantially on the line 15—15 of Fig. 14;

Fig 16 is an enlarged detail elevation of the upper left hand corner of the rear face of the forward roof section with the link connection being shown in sections, substantially on the line 16—16 of Fig. 15;

Fig. 17 is an enlarged detail elevation view of the front face of the upper right hand corner of the rear roof section, being taken substantially along the line 17—17 of Fig. 18 with all parts in elevation;

Fig. 18 is a vertical longitudinal sectional view showing the joint between the forward edge of the rear roof section and the rear edge of the intermediate roof section, being taken substantially on the line 18—18 of Figs. 17 and 20;

Fig. 19 is a side elevation similar to that shown in Fig. 15 but with the intermediate roof section in folded position over the forward roof section. Parts are broken away;

Fig. 20 is a rear end elevation of the parts as shown in Fig. 19;

Fig. 21 is an enlarged transverse sectional view substantially on the line 21—21 of Fig. 15;

Fig. 22 is a perspective detail view of the socket piece used at the upper left hand corner of the forward roof section, a similar but reversed socket piece being used at the right hand side;

Fig. 23 is a perspective detail view of a block adapted to fit in the socket piece shown in Fig. 22;

Fig. 24 is an enlarged detail sectional view illustrating the water tight joints between the rear edge of the forward roof section and the forward edge of the intermediate roof section; line 24—24 of Fig. 20;

Fig. 25 is an enlarged vertical section illustrating the joint between the rear edge of the intermediate roof section and the forward edge of the rear roof section, substantially on the line 25—25 of Fig. 7;

Referring to the drawings, 50 in Fig. 1, represents a vehicle body having sides 51, with doors 52, a back 53, and a roof in several sections. The forward portion or section 54 of the roof is shown as stationary, the rear portion or section 55 of the roof is adapted to fold over the back 53, being pivoted at 56 to the sides of the body, and the intermediate portion or section 57 of the roof is also adapted to fold, being connected to the forward section by means of links 58. In Fig. 1 the roof sections 55 and 57 are shown in folded position whereby the rear portion of the vehicle body is freely open.

In Figs. 4, 5 and 6 the framing of the body is shown in some detail. Particularly in Fig. 4 it will be seen that the frame piece 59 which forms the main part of the rear roof section 55 is pivoted by the hinges 56 above described, to blocks 60, forming parts of the side frames of the body. The back piece 61 of the framing is provided with a pair of brackets 62 extending somewhat above the top of the back-piece and provided with straps 63 which are connected to the rear part of the frame 59 of the rear roof section. Upon reference to Figs. 5 and 6 it will be seen that the straps 63 limit the upward movement of the rear roof section and act as supports to the roof section when the latter is in the folded position shown in Fig. 6.

It will be understood that the lower part of the frame work shown in Fig. 4 is covered with suitable metal paneling such as shown at 64 in Fig. 6, and the frame pieces 59 and 61 are also connected by a suitable flexible covering 65 such as leather, as shown in Figs. 5 and 6. This leather covering will of course sag to some extent when the rear roof section is folded as shown at Fig. 6.

It will be further understood that the top of the frame work of all three of the roof sections will be covered by any suitable material such as metal panels 66.

As hereinabove suggested the intermediate roof section 57 is connected to the forward roof section 54 by links 58, one at each side of the roof. This linkage is particularly illustrated in Figs. 14, 15, 19, 20 and 21, and will be later described in detail. In Fig. 15 the intermediate section 57 is shown in its normal or operative position, forming a connecting roof section between the roof sections 54 and 55. Thus there is a joint 67 between the rear edge of the forward roof section and the front edge of the intermediate section, and another joint 68 between the rear edge of the intermediate section and the forward edge of the rear section 55. In Figs. 19 and 20 the intermediate roof section 57 is shown in its folded position in which it has been moved forwardly, swinging on the links 58 and resting directly upon the forward roof section 54, being detachably secured in place by suitable straps 69, one on each side of the roof. Fig. 8 also illustrates the joints 67 and 68 above referred to and at the left end of said figure and in Fig. 12 there is illustrated one of the two clamps adapted to secure and hold the intermediate section to the forward roof section. This clamp is illustrated generally at 70. At the right of Fig. 8 there is illustrated another form of clamp for securing and holding together the edges of the intermediate and rear roof sections. This clamp is indicated generally at 71.

From Figs. 5 and 6 it will be evident that the joints 67 and 68 above referred to, between the various sections of the roof, would be plainly visible from the inside of the vehicle body when the roof sections were in normal position. Also the clamps 70 and 71, while they are countersunk in the framing of the roof sections, yet would be clearly visible to the occupants of the vehicle body. Obviously these mechanical features and this hardware are necessarily unsightly, and in the present invention provision is made to entirely conceal them after the various roof sections have been suitably clamped in normal position. This concealing means consists principally of a head lining 72 of suitable flexible material such as broadcloth of a pleasing shade to match the other lining of the body, which lining is preferably secured along its rear end to the frame piece 59 or rear part of the rear roof section 55, as shown at 73. The lining 72 extends forwardly over both of the joints 67 and 68 on the underneath or inner side of the roof sections, and intermediate its length it is provided with a transversely extending supporting strip 74 of suitable material which is preferably hand stitched on to the upper side of the lining so that its attachment to the lining is barely visible. This supporting strip 74 is illustrated in detail in Fig. 11, and by referring to said figure and Figs. 5, 8 and 9, it will be seen that the strip 74 is provided with a series of snap fasteners 75, by which it may be secured to the intermediate roof section 57 in a transverse channel or groove 76 which is clearly shown. After this supporting piece 74 has been secured in place, the extreme forward edge of the lining 72 is brought forward and secured by another series of snap fasteners 77 to the underneath side of the roof section 54 just forward of the joint 67, or sufficiently forward thereof so that it completely covers the countersinks in which the clamps 70 are located, particularly as shown in Fig. 8. See also Fig. 10. Fig. 3 illustrates the head lining only partly in position, the strip 74 having been secured to the intermediate roof section in the channel 76, and Fig. 2 illustrates the head lining fully in place thereby concealing both joints and all of the clamps.

By referring particularly to Fig. 9 it will be seen that the side edges 78 of the lining 72 are doubled and stiffened so that they may fit snugly in a space left between the underneath side of the roof and a flexible bead or molding 79 which extends along both sides. Also as shown in Fig. 3 the lining 72 is provided with several snap fasteners 80 along its side edges, to thereby retain these edges in place above the beading 79.

To complete the finish of the inside of the leather covering 65 of the rear part of the body an interior lining 81 is provided.

When the rear roof section 55 is folded as in Fig. 6 the head lining 72 may be dropped into the pocket formed by the leather covering 65, and its forward end is then secured as by the snap fasteners 77 above referred to along the forward or what is then the upper edge of the roof section 55, thus concealing the hardware attached to that section.

For the purpose of raising and lowering the movable roof sections countersunk handles 82 are provided as shown in Figs. 5 and 6.

The roof sections 54 and 57 are connected, as stated, by links 58, one on each side, and these links are each in two parts, a long part 83 and a short part 84, pivotally connected at 85, and arranged in downwardly opening grooves 86 adjacent the sides of the section 57. The rear end of the long part 83 is pivotally connected to the section 57 about intermediate of its forward and rear ends, as shown generally at 87 in Figs. 14 and 15, and in detail in Fig. 21. The forward end of the part 84 is pivoted at 88 in a slotted block 89 which is removably secured in a socket piece 90 set into one of the rear corners of the roof section 54. Said socket piece comprises a flange portion 91 and a hollow boss portion 92 into which the block 89 is inserted thereby retaining the pivot pin 88 in place. Screws 93 secure the block to the socket piece and the latter is fastened to the roof section by bolts 94 and screws 95.

The position of the links 58 when the section 57 is in normal position is shown in Figs. 14 and 15, and when in folded position in Figs. 19 and 20.

Rubber blocks 96 are provided on both sides of the section 57 to prevent marring the roof panel when the section 57 is folded.

In Fig. 24 is illustrated in detail the water tight joint between the rearward edge of the forward roof section and the forward edge of the intermediate roof section. This joint permits the intermediate section to be raised upwardly in folding, and it comprises an upwardly opening groove 97 adjacent the edge of section 54 and a downwardly extending tongue 98 on section 57 adapted to enter said groove. In the groove is a rubber tube 99 which presents its side throughout to the edge of the tongue 98 whereby the latter, in being drawn into place, slightly compresses the side of the tube and forms a close water tight joint between the sections, any water entering the groove running out at the sides of the roof. The groove 97 is continued in the flange portion of the socket member 90 as shown in Figs. 15 and 22.

For the purpose of drawing the tongue 98 of section 57 firmly down onto the rubber tube 99 the clamps 70, above referred to, are provided. Each of these clamps as shown in Figs. 8 and 12 comprises a bolt 100 secured to the section 57, a hasp 101 pivoted at 102 to the section 54, and a wing nut 103 on the bolt. The wing nut being loose, the hasp is clasped around the bolt 100, and then the edge of the section 57 is drawn downwardly relatively to the edge of the section 54 by tightening the wing nut.

In Fig. 25 is illustrated in detail the water tight joint between the rear edge of the intermediate roof section and the forward edge of the rear roof section. This joint permits the section 55 to fold backwardly away from the intermediate section 57, and it comprises a rearwardly opening groove 104 at the edge of section 57 and a tongue 105 extending from section 55 into said groove. In this groove also there is a rubber tube 106 against the side of which presses the tongue 105. There is also a rubber bumper 107 to limit the pressure of the roof sections against each other, and several dowels, as 108 and 109, assist in positioning the sections. Also a flat dowel 110 in section 55 enters a slot 111 in section 57 to prevent water blowing in at the sides.

For the purpose of drawing the tongue 105 of section 55 firmly against the rubber tube 106 the clamps 71, above referred to, are provided. Each of these clamps, as shown in Fig. 8, comprises an adjustable link 112 pivoted to one of the roof sections at 113, a lever 114, pivoted to the link, and a hook 115, on the other roof section. The operative position of the clamp is shown in full lines in Fig. 8, and the inoperative or folded position of the clamp is shown in dotted lines, a hook 116 being provided to hold the clamp in said latter position.

If desirable, the groove 86 formed in the sides of the intermediate roof section 57 may extend the full length of the section and receive the upper edge of the glass window 117 as shown in Fig. 21, and spring fingers 118 may be arranged to prevent rattle of the glass. Also there are collapsible curtain poles 119 inside the body as shown in Figs. 1 to 3.

While but one form of the invention has been shown and described, it will be apparent that changes may be made without departing from the spirit or scope of the invention.

Having thus described my invention, what I claim and desire to secure by Letters Patent, is:

1. In a vehicle body, a socket piece comprising a flange part and a hollow boss, a block adapted to fit within said hollow boss and having a slot, a link working in said slot, a pivot bolt connecting said link to said block, and means securing said block to said socket piece.

2. In a vehicle body, a socket piece comprising a flange part and a hollow boss, a block adapted to fit within said hollow boss and having a slot and a flange, a link working in said slot, a pivot bolt connecting said link to said block, and means connecting said flange to said socket piece.

3. In a vehicle body, in combination, a roof structure in two sections, links connecting the sections, a socket piece connected to one of said sections, a block secured in said socket piece and a pivot bolt connecting one of said links to said block.

4. In a vehicle body, in combination, a roof section, a relatively movable roof section, links connecting said sections, and means for clamping the edges of the sections together and drawing downwardly on one edge relative to the other edge.

5. In a vehicle body, in combination, a roof section, a relatively movable roof section, one of said sections having a socket at each side, a link pivoted in each socket and having its other end pivotally connected to the other section, means for clamping the roof sections together in normal position, said movable section being adapted to swing on said links to a folded position over the other roof section, and means for detachably securing the movable section in such folded position.

6. The combination with a closed vehicle body, of a lining for the roof of said body, said lining being detachable at one end and along its sides, and a covering strip arranged along the inside of the body adjacent the roof for concealing the detachable edge of said lining.

7. The combination with a vehicle body having a roof comprising a front stationary portion, a rear pivoted portion, and an intermediate movable portion, of a lining for said roof secured at one end to the rear portion and having detachable means for securing it to the intermediate and front portions respectively, when all three portions are in operative position.

8. The combination with a vehicle body having a roof comprising a front stationary portion, a rear pivoted portion, and an intermediate movable portion, having a transverse channel in its inner surface, of a lining for said roof secured to the front and rear portions respectively, and detachable securing means for said lining in said channel.

9. The combination with a vehicle body having a roof comprising front and rear portions and a movable intermediate portion, of a lining for said roof secured along its ends to the front and rear portions, and detachably secured to the intermediate portion.

10. The combination with a vehicle body having a roof comprising front and rear portions and a movable intermediate portion, of a lining for said roof secured along one end to the rear portion, and detachably secured to the intermediate and front portions.

11. The combination with a vehicle body having a roof comprising front and rear portions and a movable intermediate portion, of a flexible lining for said roof secured along one end to the rear portion, a supporting strip for the lining intermediate its ends and detachably secured to the intermediate portion, and detachable securing means for the other end of the lining on the front portion.

12. The combination with a body roof having a transverse channel in its inner surface, of a lining for said roof secured along one end, a supporting strip for the lining adapted to enter and be detachably secured to the roof in said channel, and means for detachably securing said lining at its other end.

13. The combination with a body roof having a transverse channel in its inner surface, of a lining for said roof secured along one end, and a supporting strip for the lining detachably secured to the roof in said channel.

14. In a vehicle body, in combination, a rear roof section adapted to fold rearwardly, a roof section forwardly of said rear section, and a head lining for the roof secured to the rear roof section and extending forwardly covering the joint between the sections and being detachably secured to the forward roof section.

15. In a vehicle body, in combination, a rear roof section adapted to fold rearwardly, a roof section forwardly of said rear section, a head lining for the roof secured to the rear roof section and extending forwardly covering the joint between the sections, means for detachably securing the lining to the forward roof section when the rear section is in normal position, and means for detachably securing the lining adjacent the edge of the rear section when the latter is in folded position.

16. The combination with the roof of a vehicle body, of a lining therefor secured along one end to the roof, a detachable securing means for the lining intermediate its ends, and detachable securing means for the lining at its other end.

17. The combination with the roof of a vehicle body, of a lining therefor secured along one end to the roof, a supporting strip extending transversely of the lining intermediate its ends, means for detachably securing said strip to the roof, and detachable securing means for the lining at the other end.

18. The combination with a roofed vehicle body, of a lining for the roof thereof and attaching means for the lining to the roof along three parallel lines, part of said means permitting ready detachability of the lining.

19. In a vehicle body, in combination, a roof structure in two relatively movable sections, links connecting the sections, said links being concealed in one position of the sections, a socket piece connected to one of said sections, and means pivoting one of said links to said socket piece.

20. In a vehicle body, in combination, a roof structure in two sections, one of said sections being provided with grooves, socket pieces mounted in the other of said sections, links normally lying in said grooves, and means pivoting one end of each link to its respective socket piece.

In testimony whereof I affix my signature.

GEORGE E. GODDARD.